United States Patent
Michaud et al.

(12) United States Patent     (10) Patent No.: US 12,170,612 B2
Michaud et al.     (45) Date of Patent: Dec. 17, 2024

(54) DATA REQUESTING AND ROUTING PROTOCOL IN A DATA MESH

(71) Applicant: Cisco Technology, Inc., San Jose, CA (US)

(72) Inventors: Frank Michaud, Pully (CH); Peshan Sampath Kalu Marakkala, Morrisville, NC (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 17/736,440

(22) Filed: May 4, 2022

(65) Prior Publication Data

US 2023/0362091 A1     Nov. 9, 2023

(51) Int. Cl.
*H04L 45/44*     (2022.01)
*G06F 16/2455*     (2019.01)
*H04L 45/42*     (2022.01)

(52) U.S. Cl.
CPC ........ *H04L 45/44* (2013.01); *G06F 16/24553* (2019.01); *H04L 45/42* (2013.01)

(58) Field of Classification Search
CPC .... H04L 45/44; H04L 45/42; G06F 16/24553
See application file for complete search history.

(56) References Cited

U.S. PATENT DOCUMENTS

| | | | |
|---|---|---|---|
| 6,950,821 B2 | 9/2005 | Faybishenko et al. | |
| 10,453,111 B2* | 10/2019 | Melcher | H04W 76/14 |
| 10,462,053 B2 | 10/2019 | Hui | |
| 10,567,280 B2 | 2/2020 | Hui et al. | |
| 10,645,056 B2 | 5/2020 | Petersen et al. | |
| 10,819,820 B1 | 10/2020 | Zhu et al. | |
| 2003/0050924 A1* | 3/2003 | Faybishenko | G06F 16/9535 707/E17.061 |
| 2010/0302947 A1* | 12/2010 | Leppanen | H04W 28/02 370/328 |
| 2013/0124465 A1* | 5/2013 | Pingel | H04L 67/12 707/610 |
| 2014/0330901 A1 | 11/2014 | Chang et al. | |
| 2016/0294872 A1* | 10/2016 | Walline | G06F 3/0604 |
| 2019/0354910 A1* | 11/2019 | Escapa | G06Q 10/06312 |

(Continued)

OTHER PUBLICATIONS

"Resource Description Framework", online: https://en.wikipedia.org/wiki/Resource_Description_Framework, Mar. 11, 2022, accessed Apr. 11, 2022, 11 pages, Wikimedia Foundation, Inc.

(Continued)

*Primary Examiner* — Chris Parry
*Assistant Examiner* — Dixon F Dabipi
(74) *Attorney, Agent, or Firm* — BEHMKE INNOVATION GROUP LLC; James M. Behmke; James J. Wong

(57) ABSTRACT

In one embodiment, a device of a data mesh divides a data query into a first subquery and a second subquery for different data sources in the data mesh, based on query routing data associated with the device. The device performs the first subquery in the data mesh, to obtain a first subquery response. The device also performs the second subquery in the data mesh, to obtain a second subquery response. The device provides a query response that aggregates the first subquery response and the second subquery response.

16 Claims, 16 Drawing Sheets

(56) References Cited

U.S. PATENT DOCUMENTS

2020/0201819 A1* 6/2020 Nishimoto ............ G06F 16/172
2022/0292092 A1* 9/2022 Brown ................ G06F 16/2246

OTHER PUBLICATIONS

"Web Ontology Language", online: https://en.wikipedia.org/wiki/Web_Ontology_Language, Apr. 10, 2022, accessed Apr. 11, 2022, 12 pages, Wikimedia Foundation, Inc.

"Introduction to Data Lakes", online: https://databricks.com/discover/data-lakes/introduction, accessed Apr. 11, 2022, 5 pages, Databricks Inc.

Dehghani, Zhamak, "Data Mesh Principles and Logical Architecture", online: https://martinfowler.com/articles/data-mesh-principles.html, Dec. 3, 2020, accessed Dec. 22, 2021, 27 pages.

"Web Ontology Language (OWL)", online: https://www.w3.org/OWL/, Dec. 11, 2012, accessed Apr. 21, 2022, 3 pages, Semantic Web Standards.

"Resource Description Framework (RDF)", online: https://www.w3.org/RDF/, Feb. 25, 2014, accessed Apr. 21, 2022, 3 pages, Semantic Web Standards.

"Data Mesh | Technology Radar | Thoughtworks", online: https://www.thoughtworks.com/radar/techniques/data-mesh, Mar. 29, 2022, accessed Apr. 21, 2022, 3 pages, Thoughtworks.

Greenberg, et al., "Metadata: A Fundamental Component of the Semantic Web", online: https://asistdl.onlinelibrary.wiley.com/doi/pdf/10.1002/bult.282, Apr./May 2003, accessed Apr. 21, 2022, 3 pages, Bulletin of the American Society for Information Science and Technology.

Dehghani, Zhamak, "Kafka Summit Europe 2021 Keynote: How to Build the Data Mesh Foundation", online: https://www.youtube.com/watch?v=QF41q10NSAs, May 12, 2021, accessed Apr. 21, 2022, 62 pages, YouTube.

Dehghani, Zhamak, "How to Move Beyond a Monolithic Data Lake to a Distributed Data Mesh", online: https://martinfowler.com/articles/data-monolith-to-mesh.html, May 20, 2019, accessed Apr. 21, 2022, 32 pages.

"Mesh Networking", online: https://en.wikipedia.org/wiki/Mesh_networking, Apr. 17, 2022, 4 pages, Wikimedia Foundation, Inc.

* cited by examiner

DATA REQUESTING AND ROUTING PROTOCOL IN A DATA MESH

TECHNICAL FIELD

The present disclosure relates generally to computer networks, and, more particularly, to a data requesting and routing protocol in a data mesh.

BACKGROUND

Data platforms have evolved over the years, with the latest generation being referred to as 'data meshes.' Initially, data was typically stored in proprietary, enterprise data warehouses, which required the enterprise to continually administer both the hardware and software needs of the system. More recently, data lakes have evolved, whereby data from many sources can be stored in a centralized manner (e.g., in the cloud) and without imposing a proprietary schema on the data, greatly simplifying the initial data ingestion operation. However, data lakes are still centralized in nature, requiring a dedicated team to administer the entirety of the data, even though different portions of the data are used by different teams and for different purposes. Thus, data meshes have recently been proposed to decentralize the data so that the different datasets remain within their own domains, referred to as 'data products.'

While decentralizing the storage and administration of the data in a data mesh can help to ensure that the right teams are responsible for the data, querying data across the different data products in the data mesh can still be quite challenging. Indeed, this may require a user to first identify the data product where their desired data resides, in order to even issue a data query. In addition, it may be left up to the user to issue multiple data queries, such as when their desired data resides across multiple data products.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
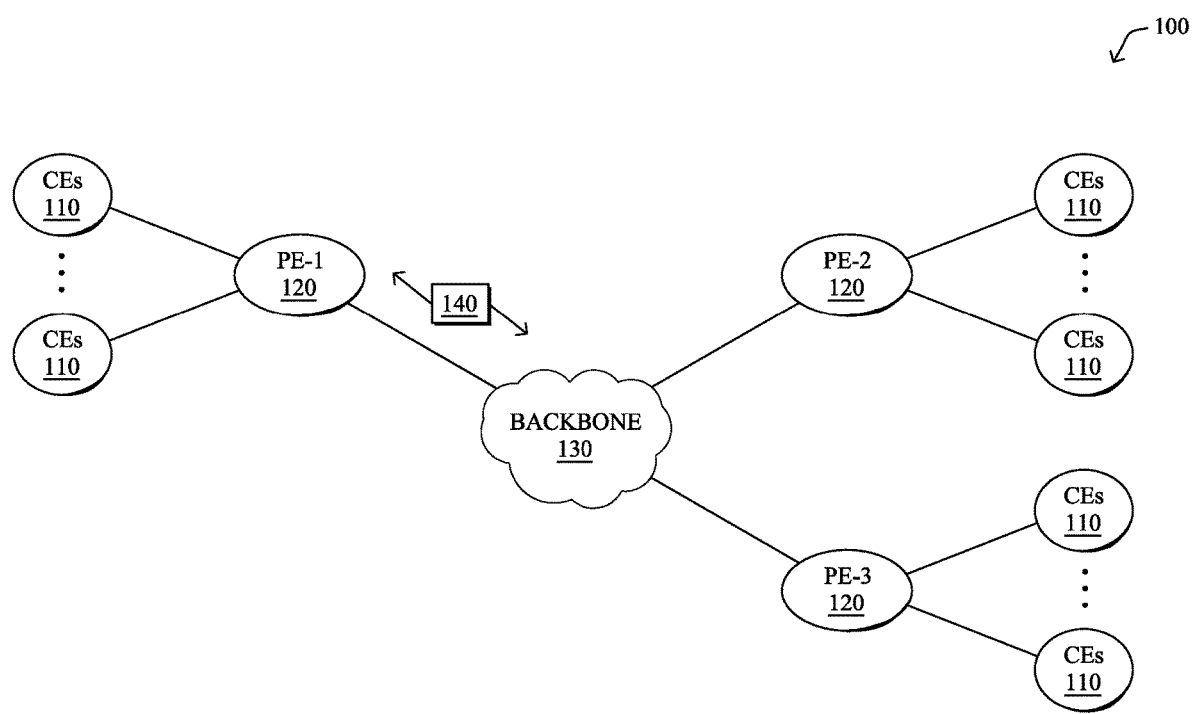
FIGS. 1A-1B illustrate an example communication network.

According to one or more embodiments of the disclosure, a device of a data mesh divides a data query into a first subquery and a second subquery for different data sources in the data mesh, based on query routing data associated with the device. The device performs the first subquery in the data mesh, to obtain a first subquery response. The device also performs the second subquery in the data mesh, to obtain a second subquery response. The device provides a query response that aggregates the first subquery response and the second subquery response.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.
2.) Site Type B: a site connected to the network by the CE router via two primary links (e.g., from different Service Providers), with potentially a backup link (e.g., a 3G/4G/5G/LTE connection). A site of type B may itself be of different types:
2a.) Site Type B1: a site connected to the network using two MPLS VPN links (e.g., from different Service Providers), with potentially a backup link (e.g., a 3G/4G/5G/LTE connection).
2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.
2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
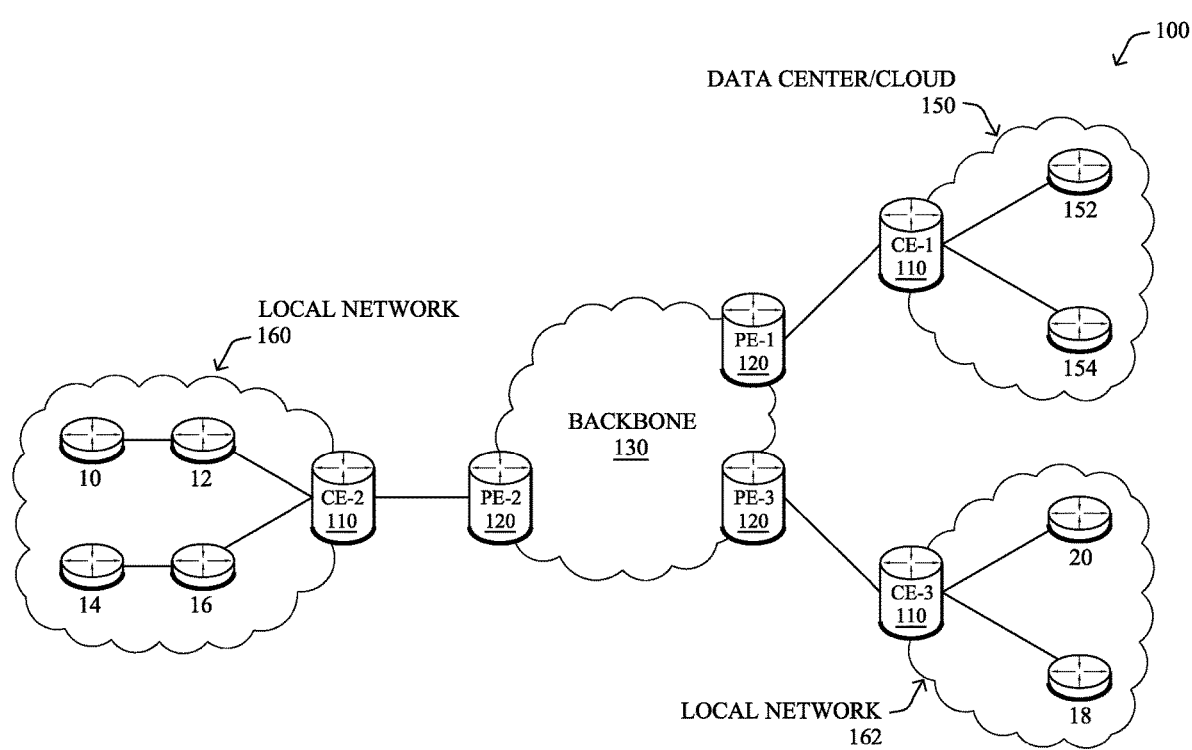

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

According to various embodiments, a software-defined WAN (SD-WAN) may be used in network 100 to connect local network 160, local network 162, and data center/cloud environment 150. In general, an SD-WAN uses a software defined networking (SDN)-based approach to instantiate tunnels on top of the physical network and control routing decisions, accordingly. For example, as noted above, one tunnel may connect router CE-2 at the edge of local network 160 to router CE-1 at the edge of data center/cloud environment 150 over an MPLS or Internet-based service provider network in backbone 130. Similarly, a second tunnel may also connect these routers over a 4G/5G/LTE cellular service provider network. SD-WAN techniques allow the WAN functions to be virtualized, essentially forming a virtual connection between local network 160 and data center/cloud environment 150 on top of the various underlying connections. Another feature of SD-WAN is centralized management by a supervisory service that can monitor and adjust the various connections, as needed.

Figure 2:
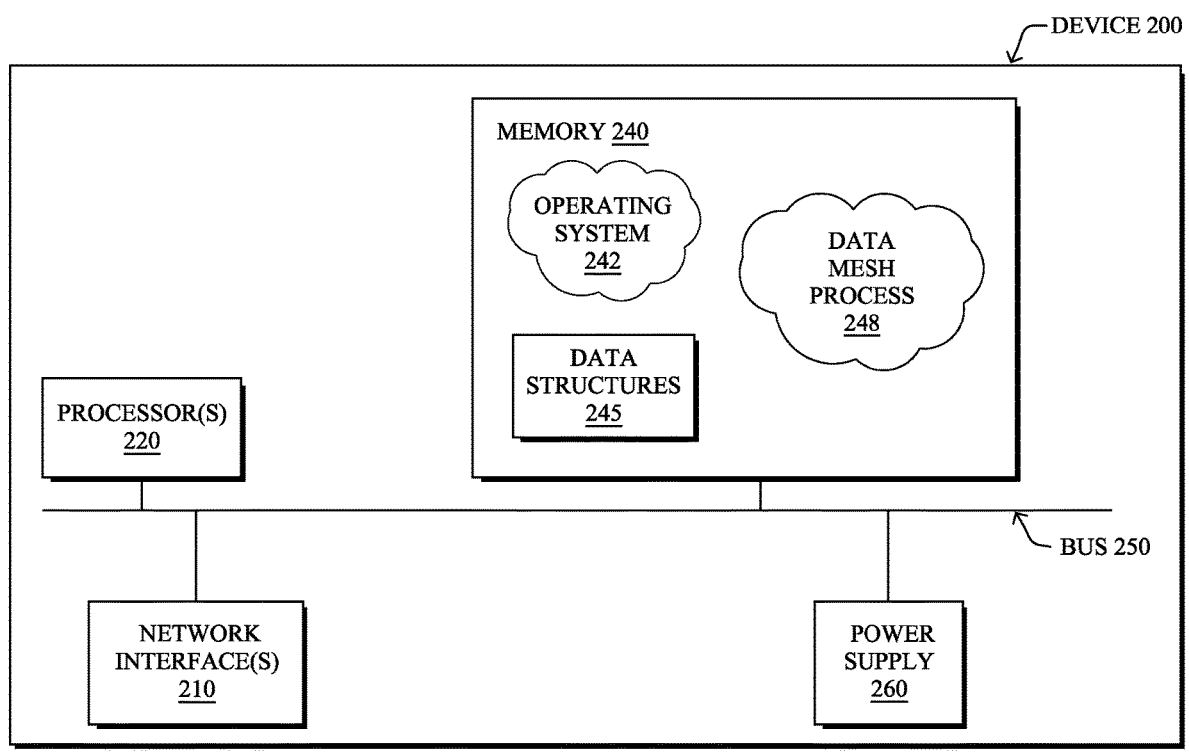
FIG. 2 illustrates an example network device/node.

FIG. 2 is a schematic block diagram of an example node/device 200 (e.g., an apparatus) that may be used with one or more embodiments described herein, e.g., as any of the computing devices shown in FIGS. 1A-1B, particularly the PE routers 120, CE routers 110, nodes/device 10-20, servers 152-154 (e.g., a network controller/supervisory service located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a data mesh process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In various embodiments, as detailed further below, data mesh process 248 may include computer executable instructions that, when executed by processor(s) 220, cause device 200 to perform the techniques described herein. To do so, in some embodiments, data mesh process 248 may utilize machine learning. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a, b, c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, data mesh process 248 may employ one or more supervised, unsupervised, or semi-supervised machine learning models. Generally, supervised learning entails the use of a training set of data, as noted above, that is used to train the model to apply labels to the input data. On the other end of the spectrum are unsupervised techniques that do not require a training set of labels. Notably, while a supervised learning model may look for previously seen patterns that have been labeled as such, an unsupervised model may instead look to whether there are sudden changes or patterns in the behavior of the metrics. Semi-supervised learning models take a middle ground approach that uses a greatly reduced set of labeled training data.

Example machine learning techniques that data mesh process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for time series), random forest classification, semantic reasoning models, or the like.

As noted above, data meshes represent the third generation of data platforms and an evolution over prior generations. In the first generation, data was typically stored in proprietary, enterprise data warehouses, which required the enterprise to continually administer both the hardware and software needs of the system. More recently, data lakes have evolved as the second generation of data platforms. In a data lake, data from many sources can be stored in a centralized manner (e.g., in the cloud) and without imposing a proprietary schema on the data, greatly simplifying the initial data ingestion operation. While this approach helps to simplify the data ingestion task and scalability issues of the first generation, the centralization of data lakes also typically requires a dedicated team to oversee the data, often without any specific knowledge of the different stakeholders that rely on that data and their needs.

Thus, to address the shortcomings of data lakes, data mesh architectures have been proposed in recent years. Among other distinctions over data lakes is the decentralized approach taken in data meshes with respect to the underlying data. More specifically, data meshes introduce a decentralized approach whereby different types of data are owned and managed by domain-specific teams.

Figure 3A:
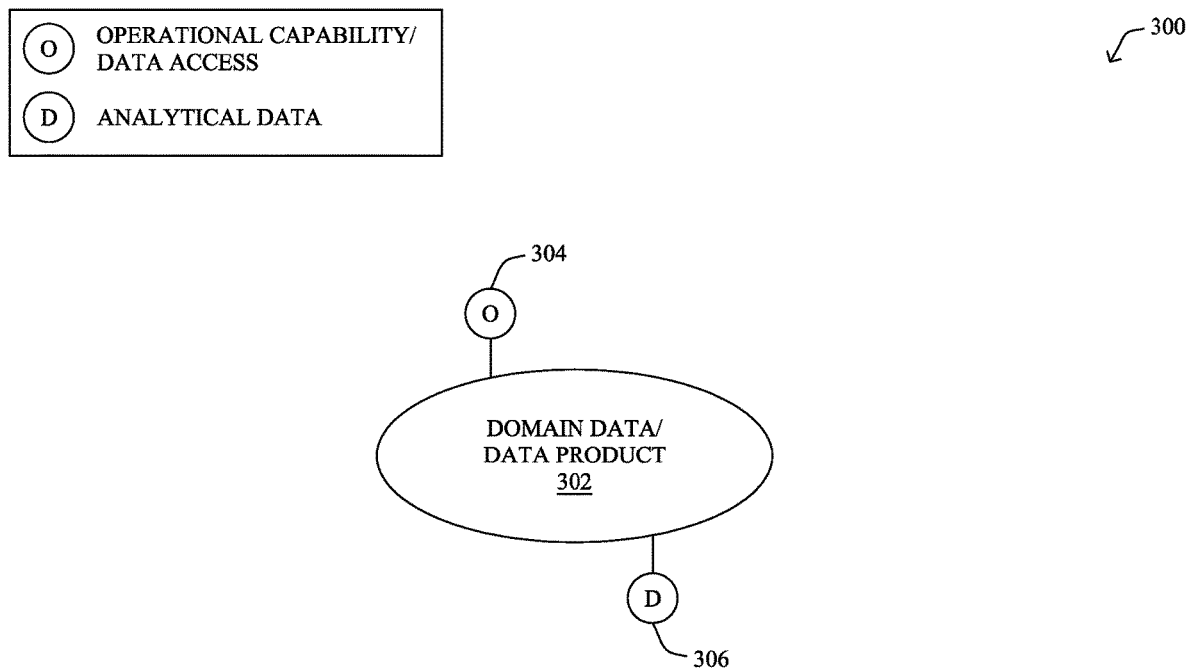
FIGS. 3A-3B illustrate examples of domains in a data mesh.
Figure 3B:
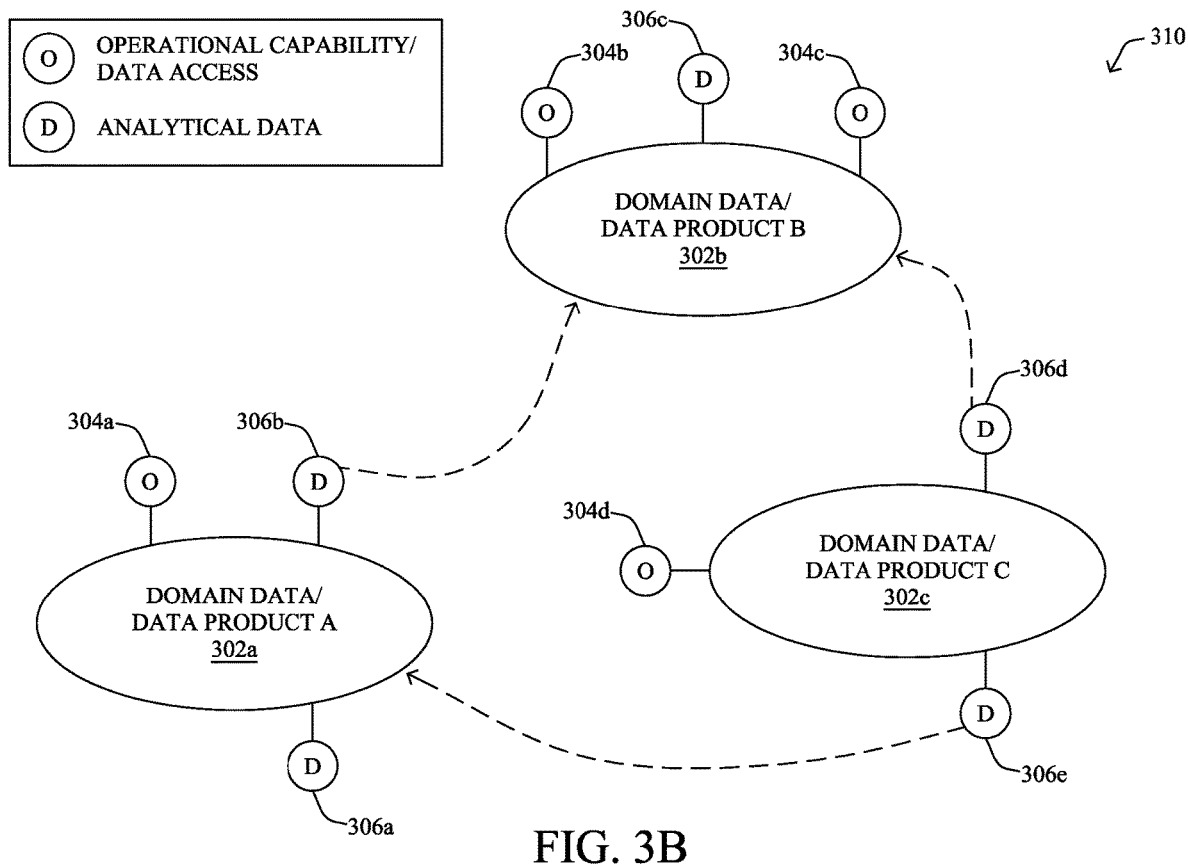

FIGS. 3A-3B illustrate examples of domains in a data mesh, according to various embodiments. FIG. 3A illustrates an example domain 300 in which a particular type of data may be grouped and treated as a 'data product,' using the terminology common in data mesh literature. More specifically, domain data/data product 302 may include source data sharing common traits that warrant being treated as a group for purposes of ownership and administration. As part of this ownership, the person or team responsible for domain data/data product 302 is also responsible for both the operational capability/data access operations 304 and analytical data access operations 306. Typically, this entails exposing this data through any number of application programming interfaces (APIs) for the domain.

By way of example, assume that domain data/data product 302 includes the data generated and used by a purchasing department of a company, such as purchase order information, delivery timing information, etc. In such a case, one operational capability/data access operation 304 may be the creation and entry of a new purchase order into the system and stored in domain data/data product 302 (e.g., through the use of a dedicated API). Conversely, one analytical data access operation 306 for domain data/data product 302 may provide a report of the purchase orders for the past week by the company.

FIG. 3B illustrates an example 310 of the interactions of different data domains within a data mesh, in various embodiments. As shown, assume now that there are three different data domains within the data mesh of a company that store domain data/data product 302a, domain data/data product 302b, and domain data/data product 302c, respectively. For instance, say that domain data/data product 302a is owned by the purchasing department of the company, domain data/data product 302b is owned by the accounts payable department of the company, and domain data/data product 302c is owned by the accounts receivable department of the company. In such a case, the purchasing department may be responsible for purchasing components and other goods used by the company, the accounts payable department may be responsible for paying for such orders, and the accounts receivable department may be responsible for receiving payments for goods or services offered by the company.

In example 310, the different data domains may have various operations associated with them, some of which expose certain information across the domains. For instance, domain data/data product 302a may have an operational capability operation 304a that allows a person to enter a new purchase order, as well as an analytical data operation 306a that allows the person to review the purchase orders that they created. In addition, there may also be another analytical data operation 306b associated with domain data/data product 302a that summarizes and reports the purchase orders for a given week from domain data/data product 302a.

Since the weekly reporting offered by analytical data operation 306b is also of value to the accounts payable department, the API or other mechanism for analytical data operation 306b may be exposed to this domain, thereby sharing certain information across the domains and into domain data/data product 302b. For instance, the report information may indicate the weekly purchase orders that will need to be paid by the accounts payable department, at some point.

Similarly, the domain of domain data/data product 302b may have its own operational capability/data access operations 304b-304c, as well as an analytical data operation 306c. Likewise, the domain of domain data/data product 302c may have an operational capability/data access operation 304d, as well as analytical data operations 306d-306e. As shown, analytical data operation 306d may be used to provide cross-domain information to the domain of domain data/data product 302b (e.g., to report the funds received by the company that are available to pay purchase orders) and analytical data operation 306e may be used to provide cross-domain information to the domain of domain data/data product 302a.

As noted above, data meshes logically divide different sets of data and metadata into different domains/data products that are typically administered separately and interconnected via APIs/data product interfaces. These interfaces may be used by a particular domain to access data in a different data domain, such as by copying the data into the particular domain, deriving data therefrom, or the like.

While data meshes afford certain advantages over prior generations of data platforms, performing queries in a data mesh can still present certain challenges. In a simple case, data may be queried from a single data product (e.g., to retrieve accounts payable records from its corresponding data product in the data mesh). Of course, this still requires prior knowledge of the correct data product to which the query should be sent.

In a more complex query scenario, consider the case in which a composite query seeks data across a plurality of data products. Today, one way to support such a query would be to build customized support into the data mesh for that specific query, such as by having one data product copy the entirety of the data into its domain from other data products (i.e., via any number of interfaces with those other data products). In other words, the data mesh could be configured to centrally store the data for the specific query, defeating one of the main advantages of data meshes.

Data Requesting and Routing Protocol in a Data Mesh

The techniques herein introduce a protocol to route data queries destined for data products in a data mesh. In some aspects, the data mesh is composed of distributed data sources which expose their data through data products. The techniques herein, therefore, allow for queries to be processed in a way that routes the query, or subsets thereof, to different data products in the data mesh.

Illustratively, the techniques described herein may be performed by hardware, software, and/or firmware, such as in accordance with data mesh process 248, which may include computer executable instructions executed by the processor 220 (or independent processor of interfaces 210) to perform functions relating to the techniques described herein.

Specifically, according to various embodiments, a device of a data mesh divides a data query into a first subquery and a second subquery for different data sources in the data mesh, based on query routing data associated with the device. The device performs the first subquery in the data mesh, to obtain a first subquery response. The device also performs the second subquery in the data mesh, to obtain a second subquery response. The device provides a query response that aggregates the first subquery response and the second subquery response.

Figure 4A:
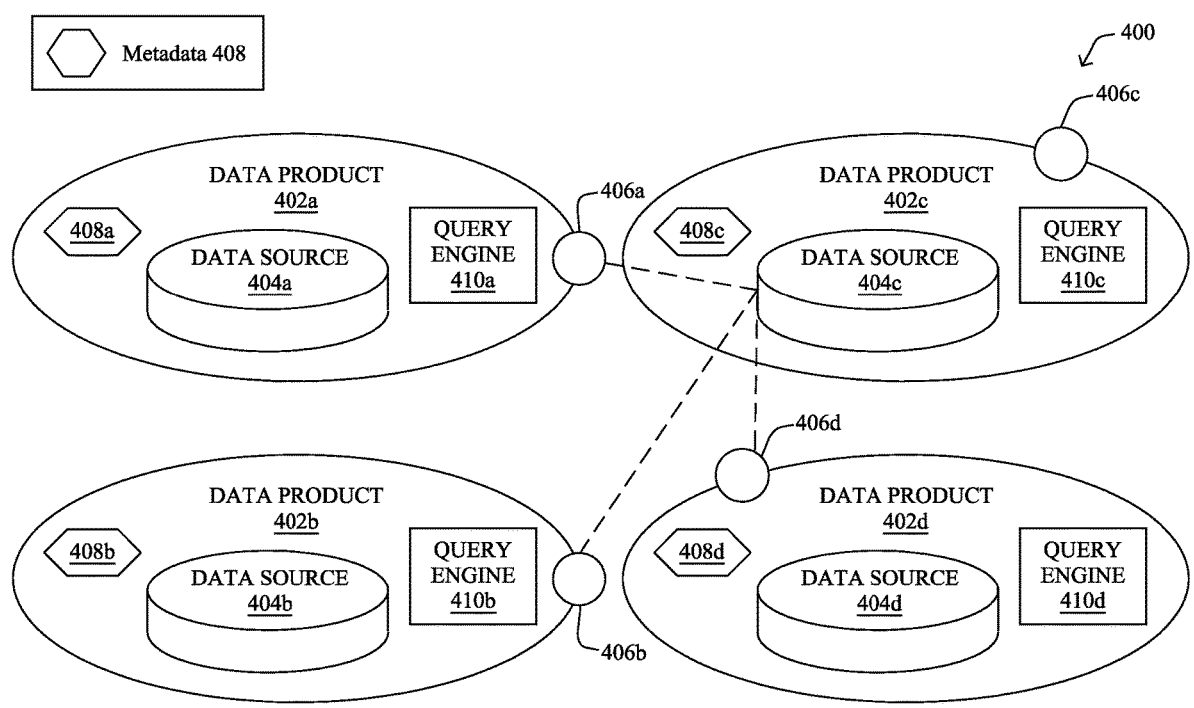
FIGS. 4A-4D illustrate examples of query processing in a data mesh.

Operationally, FIGS. 4A-4D illustrate examples of query processing in a data mesh, according to various embodiments. As shown in FIG. 4A, assume that a data mesh 400 includes four data domains/products: 402a-402d. Of course, the techniques herein could be extended to data meshes with any number of data products and only a limited number of data products are shown in FIGS. 4A-4D for illustrative purposes. In general, each data product 402 may include any number of data sources, such as data sources 404a-404d shown, as well as their own corresponding metadata 408a-408d. In addition, each data product 402 may also include any number of programmatic interfaces, such as interfaces 406a-406d shown, which may be used pass data between data products 402a-40d.

According to various embodiments, any or all of data products 402a-402d may also include a respective query engine 410a-410d configured to process an incoming data query and return a query response to the requester. Such a query engine 410 may be executed by a dedicated device of its data product 402 (e.g., a device 200), in a distributed manner across multiple devices of that data product, or in any other suitable manner.

In some embodiments, each query engine 410 may include query routing data that it can use to determine where to route an incoming data query, or a portion thereof. For instance, a query engine 410 may maintain a data routing table that stores a mapping of data topics/data types and location information for each of those topics/data types in data mesh 400. In various embodiments, such location information may include tables and/or pointers, both for locations local to the data product 402 in which the query engine 410 is located (e.g., locations within the local data source 404), as well as remote locations in data mesh 400 (e.g., other data products 402 at which the data is stored).

The query routing data leveraged by a query engine 410 may be configured in a number of different ways. In some cases, it may be configured manually, such as through the use of one or more configuration files or parameters. In other cases, population and maintenance of the query routing data may be handled automatically within data mesh 400. For instance, on ingestion of a new type of data, a data product 402 may add a new local entry into its query engine 410, as well as notify any or all of the other query engines 410 in the other data products 402 in data mesh 400, so that pointers to the new data can be added.

Thus, when a query engine 410 receives an incoming data query, it may perform a search of its query routing data, to determine whether the query can be answered using data local to that data product 402, in whole or in part. Note that the source of the data query can also vary from user-controlled sources to automated sources (e.g., a nightly data processing routine, etc.).

Figure 4B:
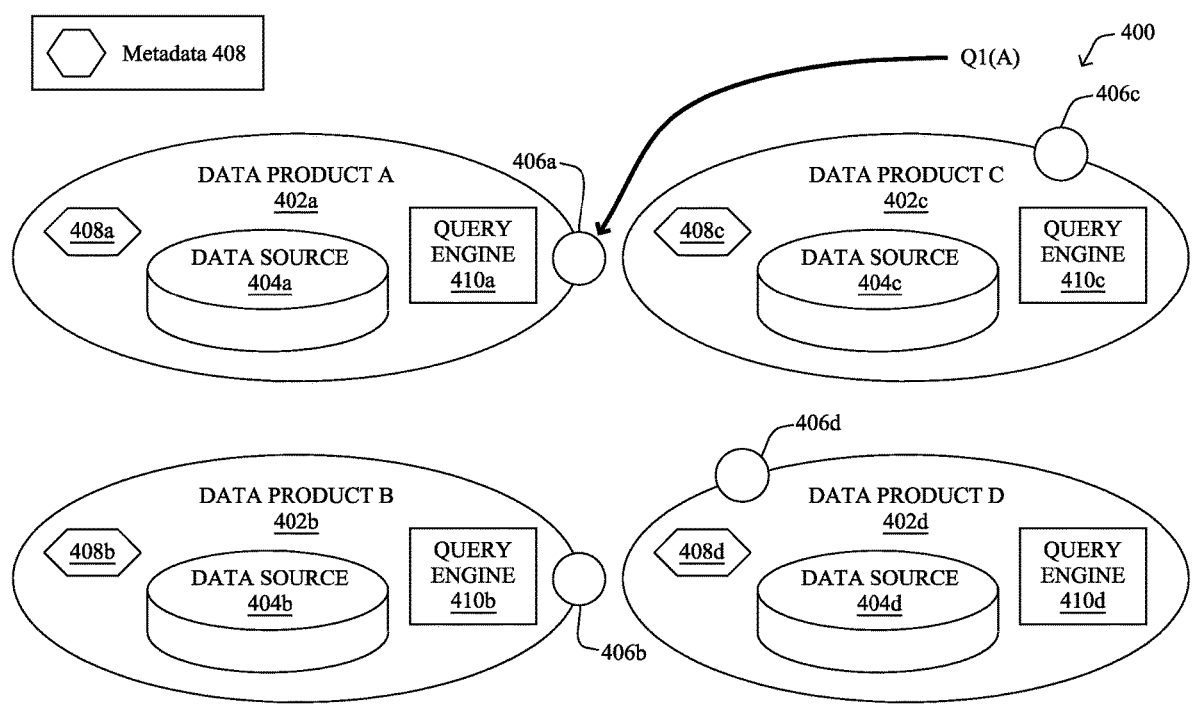

As shown in FIG. 4B, consider the case in which a data query Q1(A) is issued to data product 402a. By notation, 'A' in this query signifies that the entirety of the data being queried is stored locally within data source 404a in data product 402a. Accordingly, query engine 410a of data product 402a may search its query routing data for data that matches 'A,' retrieve that data rom data source 404a, and provide a query response with the retrieved data to the requester.

Figure 4C:
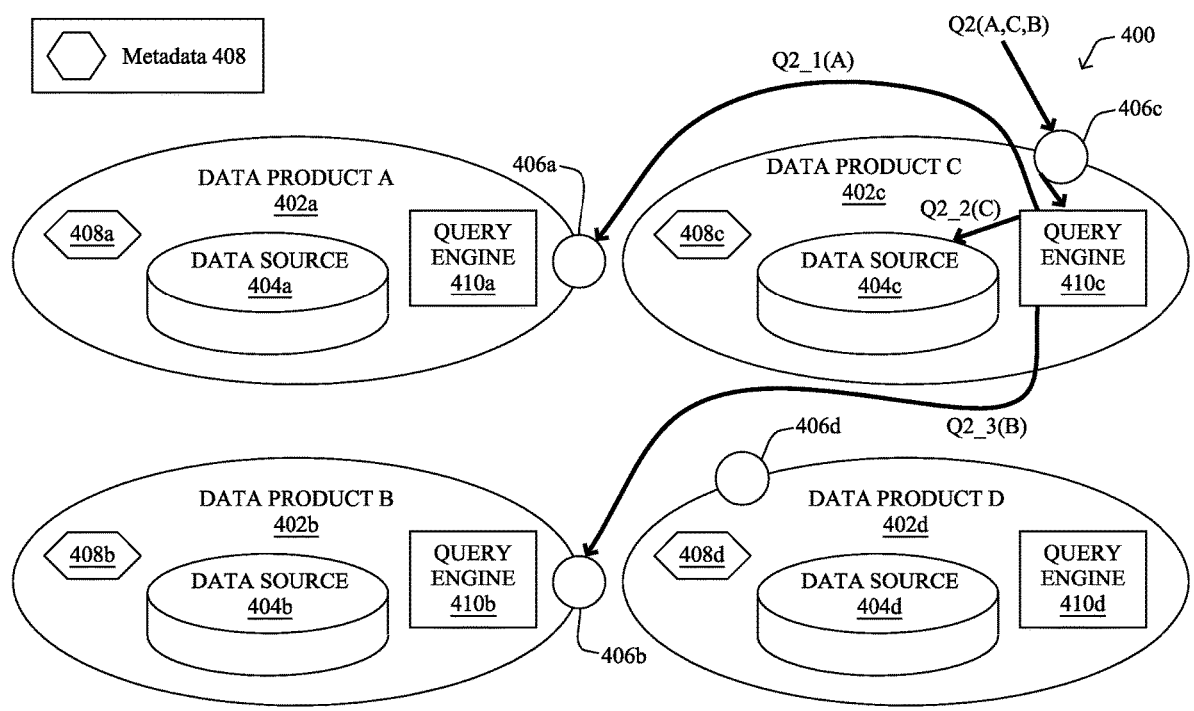

In various embodiments, a query engine 410 shown may also be configured to handle composite queries that seek data stored across multiple data products 402. For instance, as shown in FIG. 4C, now assume that a second data query Q2(A, C, B) is issued to data product 402c. In this case, the data being queried is stored across data products 402a-402c, meaning that it cannot be satisfied locally by data product 402c.

In some embodiments, query engine 410c may subdivide data query Q2 into its constituent subset queries, based on its stored query routing data: a first subquery Q2_1(A) for the portion of the desired data stored in data product 402a, a second subquery Q2_2(C) for the portion of the desired data stored locally by data source 404c in data product 402c, and a third subquery Q2_3(B) for the final portion of the desired data stored locally by data product 402b. In turn, query engine 410c may issue each of these subqueries to these respective targets.

Since subqueries Q2 may take different amounts of time to process within data mesh 400, query engine 410c may attempt to synchronize its response to data query Q2, in various embodiments. For instance, local subquery Q2_2 may resolve quicker than those of remote subqueries Q2_1 and Q2_3. In such a case, query engine 410c may hold off on responding until it receives responses to all of the subqueries and is able to aggregate those responses into a finalized response for the requester. In a further embodiment, to aid in the resolution of the subqueries, a (sub)query may be routed as a packet but taking the data topic/data type into account, rather than the IP address in the routing table. In another embodiment, the system can be further optimized by employing an asynchronous response mechanism, such as by having the data query from the requester be sent with a (web) hook where a delayed response can be sent back. Temporary responses could also be sent back to the requester, to express the expected time delay, as well.

Figure 4D:
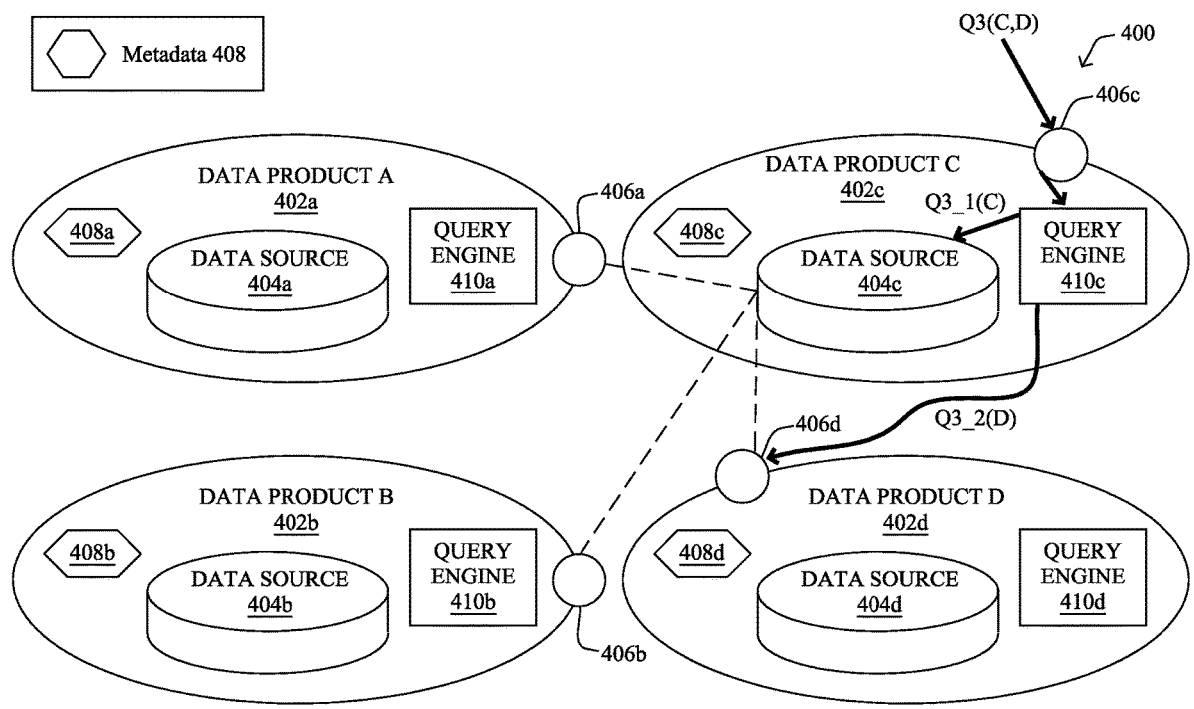

FIG. 4D illustrates the resolution of yet another query, Q3(C, D) that likewise queries data stored across data products 402c-402d. Similar to FIG. 4D, query engine 410c may use its query routing data (e.g., in its query routing table) to subdivide query Q3 into a first subquery Q3_1 to be performed locally within data product 402c and a second, remote subquery Q3_2 to be performed remotely with respect to data product 402d. In turn, query engine 410c may aggregate the results from these subqueries and send a query response back to the requester.

In some embodiments, another potential optimization for the query mechanism introduced herein may be for a query engine 410 to identify opportunities to synthesize queried data that resides in another data product 402. For instance, assume that subquery Q3_2(D) queries certain data resident in data product 402d, but that data source 404c in data product 402c includes data that is derived therefrom through an extract-transform-load (ETL) pipeline with data product 402c. In such cases, query engine 410c may determine that it already has access within data product 402c to answer subquery Q3_3(D) using data available from data source 404c or other buffered data of data product 402c (e.g., the raw data reported to data product 402c used to derive what is actually stored in data source 404c). Of course, a data product 402 may only buffer data if it is allowed to, according to its security metadata 408 (e.g., indicating that buffering the data would not constitute a privacy or data sovereignty violation).

A key observation with respect to data meshes is that different users may have very different interests and with respect to a certain dataset. For instance, a SecDevOps user may primarily be concerned with sensitive data being exposed to unauthorized entities, the physical location of a data source for compliance with a data privacy policy or data sovereignty policy. For instance, the General Data Protection Regulation (GDPR) in the European Union has very strict requirements in terms of how personal data may be collected, stored, and shared. In contrast, though, a machine learning operations (MLOps) user may not care at all about such information and instead be concerned with whether the dataset has been cleansed from having duplicate information, errors, and the like. Accordingly, in some embodiments, the techniques herein propose the use of metadata layers for a data mesh that are user role-specific.

Figure 5A:
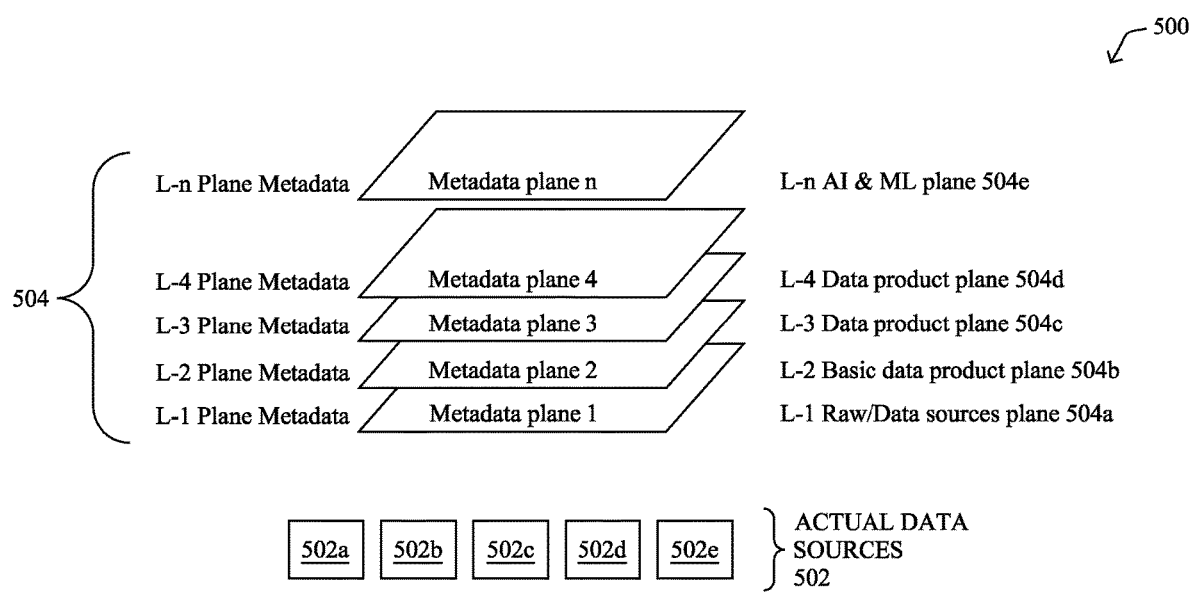
FIGS. 5A-5D illustrate an example of the generation of metadata layers in a data mesh.

FIGS. 5A-5D illustrate an example of the generation of metadata layers in a data mesh, according to various embodiments. FIG. 5A illustrates an example 500 of a multi-layered, metadata-based approach introduced herein. In general, the proposed approach entails building n-number of metadata layers 504 on top of a dataset in a data mesh from any number of actual data sources 502.

For instance, as shown, assume that there are five data sources 502: data sources 502a-502e, which may each store a portion of the underlying dataset. In some embodiments, each of data sources 502a-502e may be located at different places (e.g., geolocations, storage racks, etc.). Of course, there may be any number of data sources 502, in other implementations, and only five data sources 502 are shown in FIGS. 5A-5D for purposes of simplicity.

In various embodiments, metadata layers 504 may essentially form a hierarchy of metadata layers whereby its lowest layer, layer 504a includes metadata for data sources 502a-502e, with higher level layers (e.g., layers 504b-504e shown) including more finished data products that may be tailored specifically to different user roles. In this context, the metadata in metadata layers 504 may take the form of referential data for the actual data sources 502, resulting in a decentralized, reference-based model for the data mesh. In various embodiments, this could take the form of a relational data model, graph data model, or the like, that interconnect connect the metadata between the various metadata layers 504, as well as to data sources 502.

Said differently, the techniques herein propose building a hierarchy (e.g., a semantic ontology) of metadata that may include any or all of the following:
  Descriptive metadata used for the discovery of data products at different layers/planes of metadata layers 504.
  Structured metadata regarding how the data products in the data mesh are organized.

Administrative metadata indicative of the routing, access control, and/or governance policies for the data products.

Etc.

In addition, metadata layers 504 also allow for the automation of create, read, update, and delete (CRUD) operations of metadata at different planes/layers of metadata layers 504.

Figure 5B:
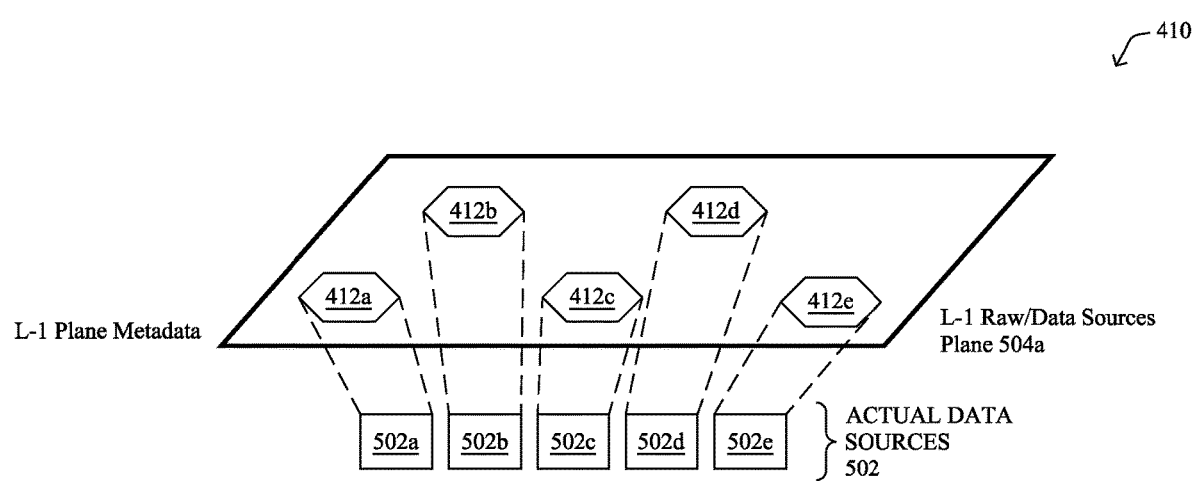

FIG. 5B illustrates an example 510 of how the lowest layer 504a of metadata layers 504 may be constructed within the data mesh (e.g., by a specially-configured device 200 of the data mesh), in various embodiments. Here, the proposed solution is to construct the layers of metadata layers 504 using a bottom-up approach, starting with data sources 502. In various embodiments, as shown, the lowest layer 504a of metadata layers 504 may be generated to include metadata 512a-512e for data sources 502a-502e, respectively. For instance, metadata 512a-512e may include metadata regarding the types of information stored by the respective data sources 502a-4502e, their geolocations, or the like.

Figure 5C:
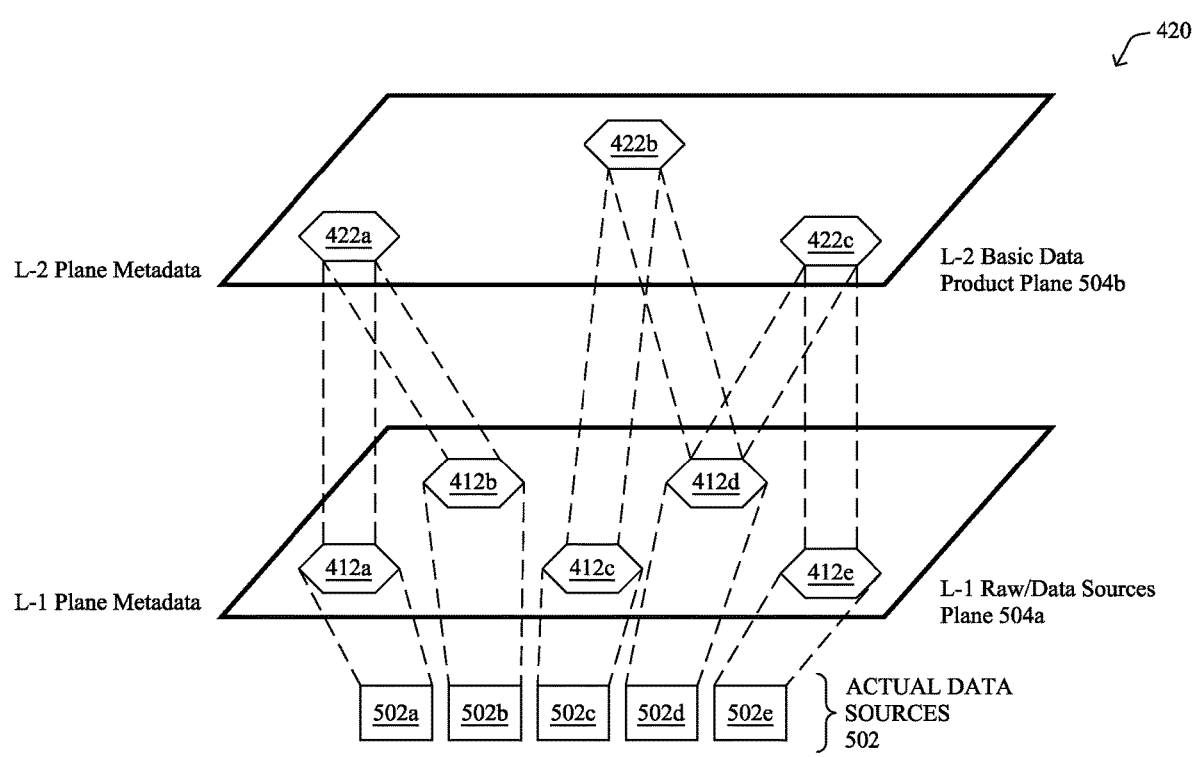

FIG. 5C illustrates an example 520 of the formation of a second layer 504b of metadata layers 504, according to various embodiments. Here, metadata 522a-522c in second layer 504b may be constructed on top of metadata 512a-512e in layer 504a. In other words, the metadata 522a-522c in layer 504b may represent an ontology of this data plane. In some embodiments, metadata 522a-522c may also be user role-specific, in whole, or in part. For instance, assume that layer 504b has been dedicated to support DevOps users and include metadata 522a-522c that is relevant to these users, such as integration-related types of metadata.

Figure 5D:
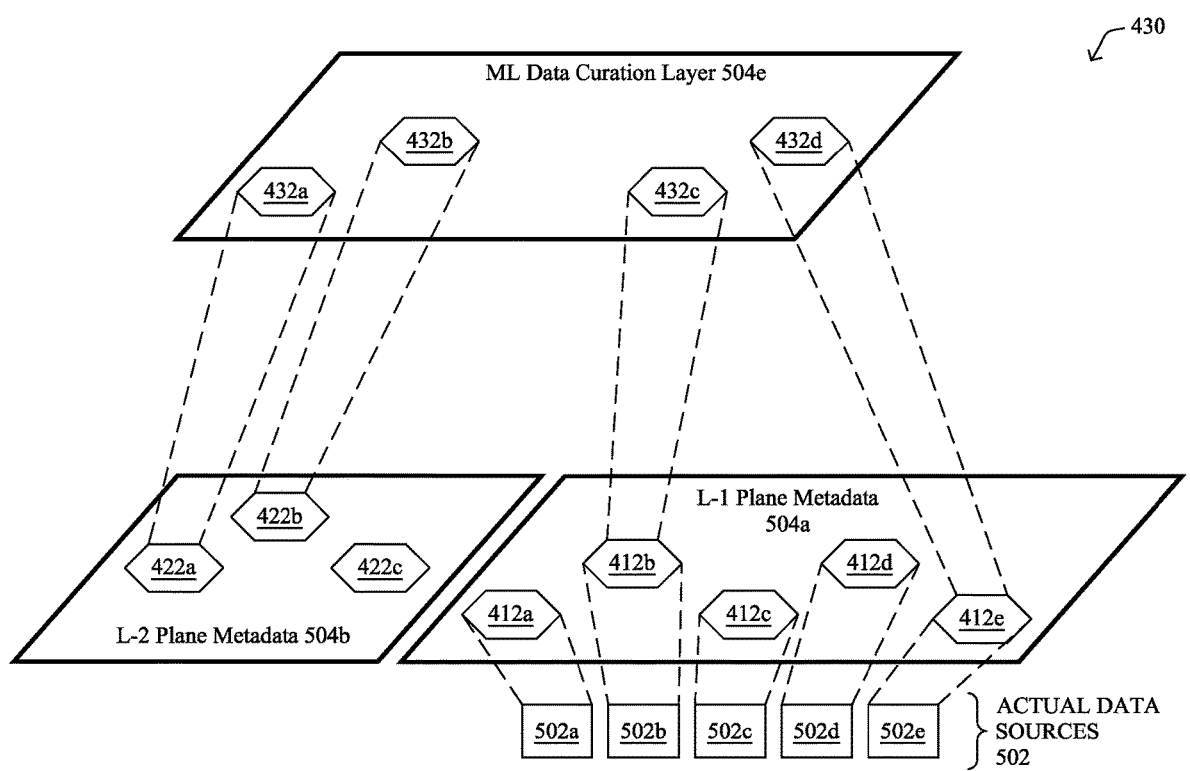

FIG. 5D illustrates an example 530 of the formation of a metadata plane that functions as the 'top' layer 504e of metadata layers 504, according to various embodiments. In various embodiments, layer 504e may include metadata 532a-532d that may be based on any or all of metadata 512a-512e in layer 504a, any or all of metadata 522a-522c in layer 504b, any or all of the metadata in any other layers in metadata layers 504 between layer 504e and layer 504b, or combinations thereof. In various embodiments, at least a portion of 532a-532d may also be user role-specific, such as for a different user role than that associated with layer 504b. For instance, as shown, metadata 532a-532d may include metadata related to machine learning (ML) data curation for presentation to an MLOps user (e.g., regarding the data preparation, data curations, etc.).

Figure 6:
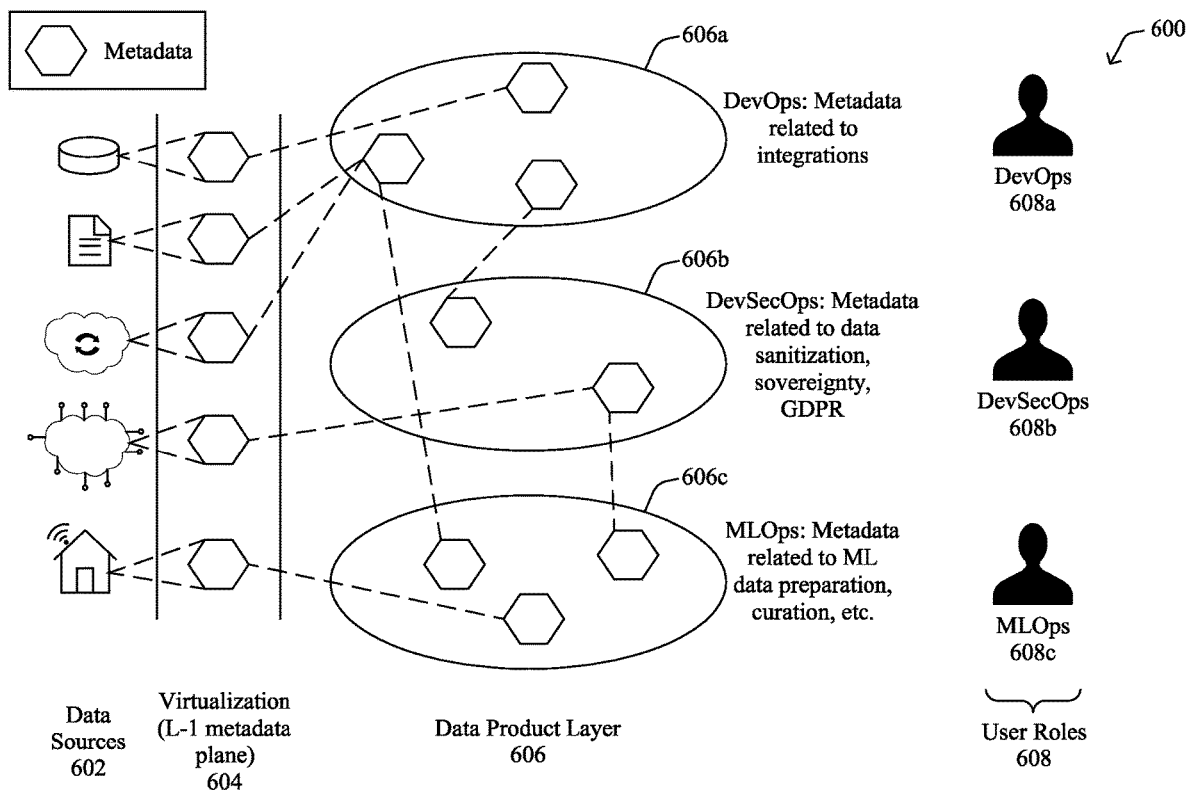
FIG. 6 illustrates an example of user role-specific metadata layers in a data mesh.

FIG. 6 illustrates an example 600 of user role-specific metadata layers in a data mesh, according to various embodiments. Continuing the previous examples in FIG. 4A-4D, assume that there are three user roles 608 that will use the data mesh to access information: a DevOps role 608a, a DevSecOps role 608b, and an MLOps role 608c. Further assume that these types of users will all make use of a dataset stored across any number of data sources 602.

In various embodiments, a device (or set of devices) may form a metadata layer 604 that includes a base set of metadata regarding the dataset stored across data sources 602 (e.g., their locations, types of data, etc.). In turn, this metadata can be used to also form corresponding metadata layers 606a-606c that include metadata specific to user roles 608a-608c, respectively. Similar to the examples in FIG. 5A-5D, metadata layers 606a-606c may also be hierarchical in nature. For instance, the MLOps layer 606c may exist at the top of the hierarchy, as it includes metadata based on metadata found in layer 604, as well as in layers 606a-606b. Below MLOps layer 606c, but above DevOps layer 606a, may also be DevSecOps layer 606b, which includes metadata based on both metadata found in layer 604, as well as in DevOps layer 606a.

It should be noted that while the proposed metadata layers are hierarchical in nature, some embodiments also provide for the metadata at a higher layer to be based on metadata found in any or all of the layers below it. For instance, while MLOps layer 606c may include metadata based on layer 606b directly below it, it may also include metadata based on layer 606a and/or layer 604.

Figure 7:
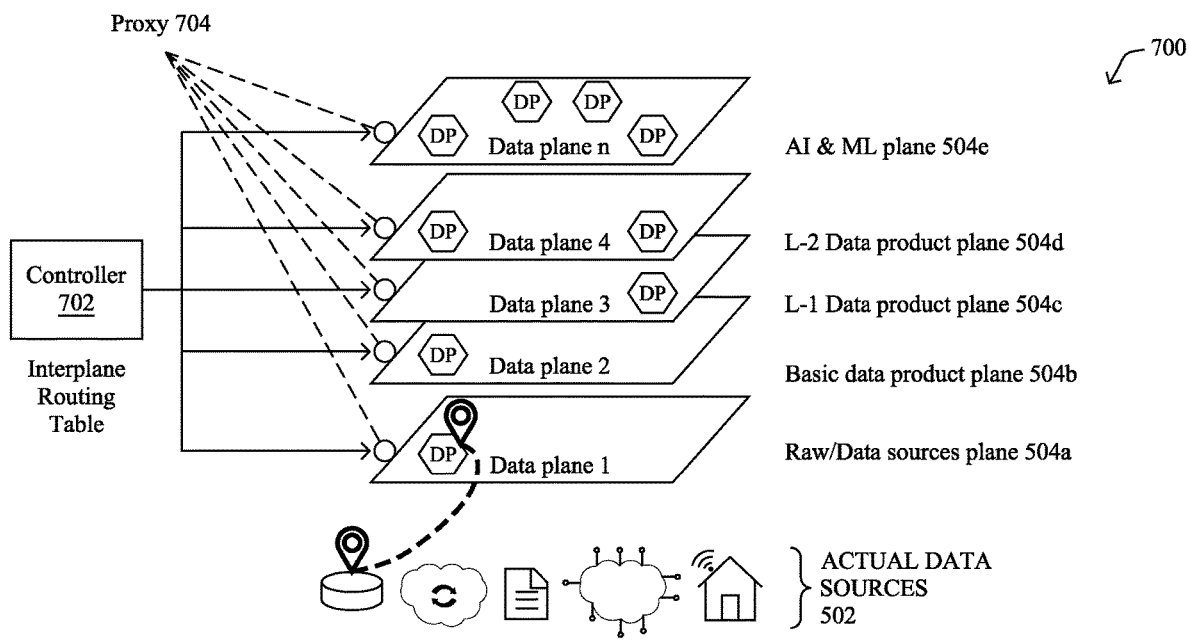
FIG. 7 illustrates an example of query processing in a data mesh having user role-specific metadata layers.

FIG. 7 illustrates an example 700 of query processing in a data mesh having user role-specific metadata layers, according to various embodiments. As shown, consider again metadata layers 504a-504e constructed on top of data sources 502 within the data mesh. To extend the above query protocol to such an architecture, a controller 702 may be responsible for the interplane routing of any queries or subqueries within the data mesh, in various embodiments. Here, controller 702 may function in a similar manner to that of a query engine 410 shown previously in FIGS. 4A-4D, through the use of query routing data that it may store in an interplane routing table.

When controller 702 receives a query, it may consult its query routing data to determine which metadata layers 504 store the relevant data. In turn, as shown, controller 702 may issue any resulting subqueries to one or more proxies 704 associated with the target metadata layers 504, thus doing so in a hierarchical manner. In some instances, each proxy 704 may also be responsible for the data security policies applied to its layer 504 (e.g., to prevent data leakage or policy violations). In various embodiments, the receiving proxies 704 may be responsible for then routing the subqueries to the underlying data sources 502 at which the actual data is stored. This can be achieved, for instance, through the use of a mapping that indicates the physical locations of the data.

Once controller 702 has received the responses to its subqueries (or singular query), it may aggregate the results into a query response that it then sends back to the requester. For instance, controller 702 may provide the query response for display to a user that queried the data mesh for a certain set of data stored across different data products and metadata layers.

Figure 8:
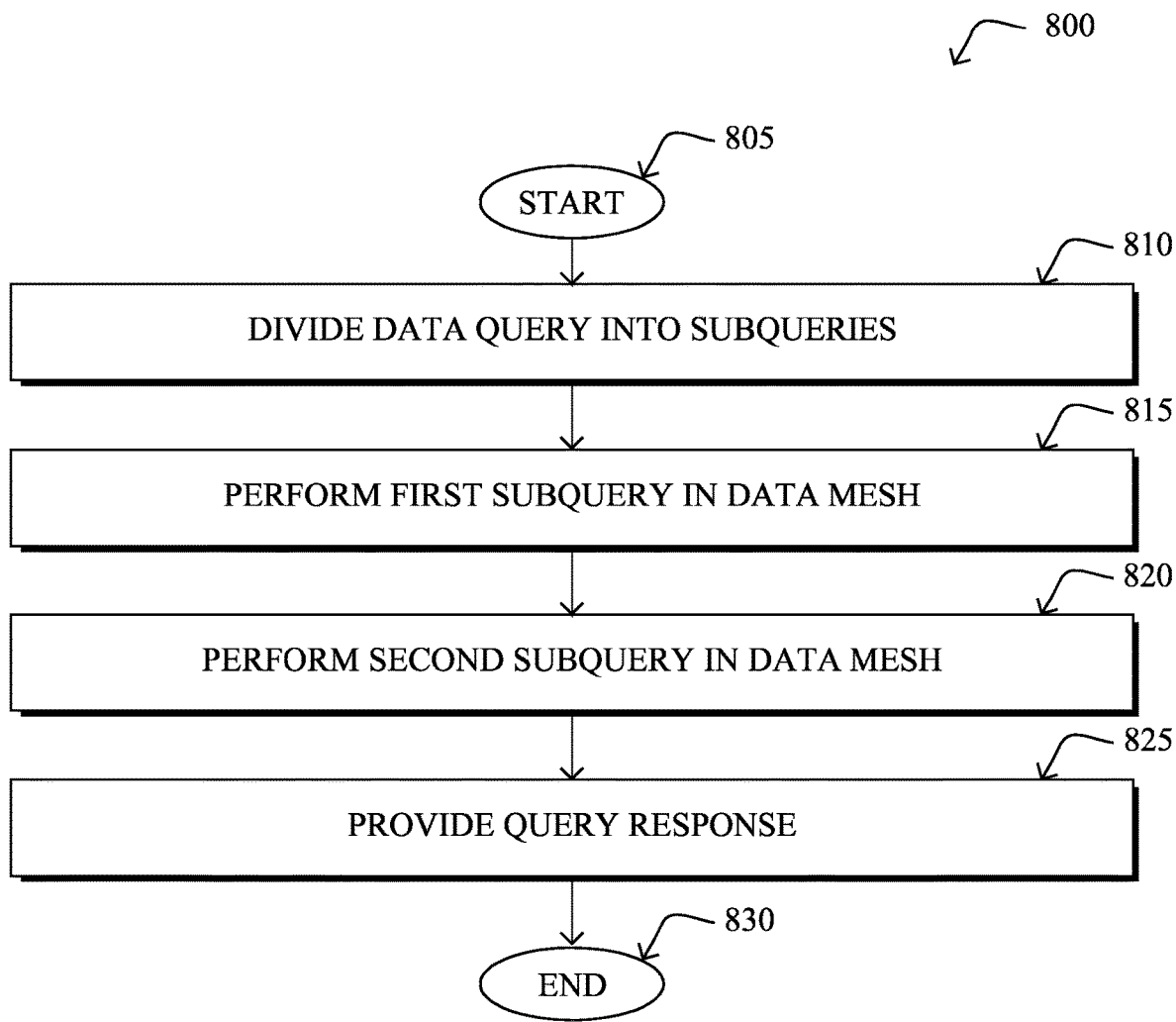
FIG. 8 illustrates an example simplified procedure for performing a query in a data mesh.

FIG. 8 illustrates an example simplified procedure 800 (e.g., a method) for performing a query in a data mesh, in accordance with one or more embodiments described herein. For example, a non-generic, specifically configured device (e.g., device 200), such as a controller or other device of a data mesh may perform procedure 800 by executing stored instructions (e.g., data mesh process 248). The procedure 800 may start at step 805, and continues to step 810, where, as described in greater detail above, the device may divide a data query into a first subquery and a second subquery for different data sources in the data mesh, based on query routing data associated with the device. In some embodiments, the device is associated with a first data product in the data mesh. In one embodiment, each data product in the data mesh comprises a decentralized, separately administered set of metadata and stored data. In further embodiments, the device is a controller for the data mesh, and wherein the data mesh comprises a plurality of user role-specific metadata layers. In one embodiment, the plurality of user role-specific metadata layers are hierarchical. In another embodiment, at least one user role is a machine learning operations role or a data security role. In additional embodiments, the device may divide the data query in part by determining that at least a portion of the data query can be resolved locally by the device using data derived from a remote data source. In another embodiment, the query routing data comprises a mapping between data types and pointers in the data mesh to data sources.

At step 815, as detailed above, the device may perform the first subquery in the data mesh, to obtain a first subquery response. In one embodiment, the first subquery is performed within a first data product in the data mesh. In another embodiment, the device may do so by sending first subquery is sent to one or more local data sources for that data derived from the remote data source.

At step 820, the device may perform the second subquery in the data mesh, to obtain a second subquery response, as described in greater detail above. In one embodiment, the second subquery is performed with respect to at least a second data product in the data mesh. In some embodiments, the device performs the first subquery and the second subquery by sending the first subquery and the second subquery to proxies for different user role-specific metadata layers of the data mesh. In one embodiment, the device uses one or more of the pointers in its mapping to determine where to send the second subquery.

At step 825, as detailed above, the device may provide a query response that aggregates the first subquery response and the second subquery response. For instance, the device may provide the query response for display to a user that issued the data query, to a system that issued the data query, or the like. Procedure 800 then ends at step 830.

It should be noted that while certain steps within procedure 800 may be optional as described above, the steps shown in FIG. 8 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

While there have been shown and described illustrative embodiments that provide for performing a query in a data mesh, it is to be understood that various other adaptations and modifications may be made within the spirit and scope of the embodiments herein.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

The invention claimed is:

1. A method comprising:

dividing, by a device of a data mesh that comprises a plurality of user role-specific metadata layers, a data query into a first subquery and a second subquery for different data sources in the data mesh, based on query routing data associated with the device, wherein the device is associated with a first data product in the data mesh, the first subquery is performed within the first data product, and the second subquery is performed with respect to at least a second data product in the data mesh;

performing, by the device, the first subquery in the data mesh, to obtain a first subquery response by sending the first subquery to a proxy for a user-role specific metadata layer of the plurality of user role-specific metadata layers;

performing, by the device, the second subquery in the data mesh, to obtain a second subquery response by sending the second subquery to a proxy for a different user-role specific metadata layer of the plurality of user role-specific metadata layers; and providing, by the device, a query response that aggregates the first subquery response and the second subquery response.

2. The method as in claim 1, wherein each data product comprises a decentralized, separately administered set of metadata and stored data.

3. The method as in claim 1, wherein the device is a controller for the data mesh.

4. The method as in claim 3, wherein the plurality of user role-specific metadata layers are hierarchical.

5. The method as in claim 3, wherein at least one user role is a machine learning operations role or a data security role.

6. The method as in claim 1, wherein dividing the data query into the first subquery and the second subquery, comprises:

determining, by the device, that at least a portion of the data query can be resolved locally by the device using data derived from a remote data source, wherein the first subquery is sent to one or more local data sources for that data derived from the remote data source.

7. The method as in claim 1, wherein the query routing data comprises a mapping between data types and pointers in the data mesh to data sources.

8. The method as in claim 7, wherein the device uses one or more of the pointers in the mapping to determine where to send the second subquery.

9. An apparatus, comprising:

one or more network interfaces;

a processor coupled to the one or more network interfaces and configured to execute one or more processes; and a memory configured to store a process that is executable by the processor, the process when executed configured to:

divide a data query into a first subquery and a second subquery for different data sources in a data mesh that comprises a plurality of user role-specific metadata layers, based on query routing data associated with the apparatus, wherein the apparatus is associated with a first data product in the data mesh, the first subquery is performed within the first data product, and the second subquery is performed with respect to at least a second data product in the data mesh;

perform the first subquery in the data mesh, to obtain a first subquery response by sending the first subquery to a proxy for a user-role specific metadata layer of the plurality of user role-specific metadata layers;

perform the second subquery in the data mesh, to obtain a second subquery response by sending the second subquery to a proxy for a different user-role specific metadata layer of the plurality of user role-specific metadata layers; and provide a query response that aggregates the first subquery response and the second subquery response.

10. The apparatus as in claim 9, wherein each data product comprises a decentralized, separately administered set of metadata and stored data.

11. The apparatus as in claim 9, wherein the apparatus is a controller for the data mesh.

12. The apparatus as in claim 11, wherein the plurality of user role-specific metadata layers are hierarchical.

13. The apparatus as in claim 11, wherein at least one user role is a machine learning operations role or a data security role.

14. The apparatus as in claim 9, wherein the apparatus divides the data query into the first subquery and the second subquery by:
   determining that at least a portion of the data query can be resolved locally by the apparatus using data derived from a remote data source, wherein the first subquery is sent to one or more local data sources for that data derived from the remote data source.

15. The apparatus as in claim 9, wherein the query routing data comprises a mapping between data types and pointers in the data mesh to data sources.

16. A tangible, non-transitory, computer-readable medium storing program instructions that cause a device of a data mesh that comprises a plurality of user role-specific metadata layers to execute a process comprising:
   dividing, by the device, a data query into a first subquery and a second subquery for different data sources in the data mesh, based on query routing data associated with the device, wherein the device is associated with a first data product in the data mesh, the first subquery is performed within the first data product, and the second subquery is performed with respect to at least a second data product in the data mesh;
   performing, by the device, the first subquery in the data mesh, to obtain a first subquery response by sending the first subquery to a proxy for a user-role specific metadata layer of the plurality of user role-specific metadata layers;
   performing, by the device, the second subquery in the data mesh, to obtain a second subquery response by sending the second subquery to a proxy for a different user-role specific metadata layer of the plurality of user role-specific metadata layers; and
   providing, by the device, a query response that aggregates the first subquery response and the second subquery response.

* * * * *